United States Patent
Desai et al.

(10) Patent No.: US 12,120,658 B2
(45) Date of Patent: Oct. 15, 2024

(54) APPARATUS, SYSTEM AND METHOD OF SCHEDULING COMMUNICATION VIA A PLURALITY OF BLUETOOTH RADIOS

(71) Applicant: INTEL CORPORATION, Santa Clara, CA (US)

(72) Inventors: Prasanna Desai, Elfin Forest, CA (US); Noam Ginsburg, Haifa (IL); Sunil Kumar, Cupertino, CA (US); Hakan Magnus Eriksson, Portland, OR (US); Yashodhara Devadiga, San Diego, CA (US); David Birnbaum, Modiin (IL); Atsuo Kuwahara, Portland, OR (US); Avihay Cohen, Karkur (IL); Arnaud Pierres, Cupertino, CA (US); Guy Halperin, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 781 days.

(21) Appl. No.: 17/132,068

(22) Filed: Dec. 23, 2020

(65) Prior Publication Data
US 2021/0168828 A1    Jun. 3, 2021

(51) Int. Cl.
*H04W 72/12* (2023.01)
*H04W 4/80* (2018.01)
*H04W 84/12* (2009.01)

(52) U.S. Cl.
CPC .............. *H04W 72/12* (2013.01); *H04W 4/80* (2018.02); *H04W 84/12* (2013.01)

(58) Field of Classification Search
CPC ........ H04W 72/12; H04W 4/80; H04W 84/12
See application file for complete search history.

(56) References Cited

U.S. PATENT DOCUMENTS

| | | | |
|---|---|---|---|
| 2007/0213008 A1* | 9/2007 | Lee | H04B 7/02 455/41.2 |
| 2008/0161037 A1* | 7/2008 | Rayzman | H04W 72/1215 455/552.1 |
| 2008/0212648 A1* | 9/2008 | Jougit | H04W 88/06 375/E1.001 |
| 2010/0136910 A1* | 6/2010 | Lee | H04W 8/005 455/41.2 |
| 2020/0229215 A1* | 7/2020 | Kondareddy | H04W 72/0446 |

OTHER PUBLICATIONS

Bluetooth Core Specification V 5.0, Dec. 6, 2016, 2822 pages.

* cited by examiner

*Primary Examiner* — Brenda H Pham
(74) *Attorney, Agent, or Firm* — Shichrur & Co.

(57) ABSTRACT

For example, a Bluetooth (BT) device may include a first BT radio; a second BT radio; and a BT controller configured to control BT activities of the first and second BT radios, the BT controller configured to process a Host Controller Interface (HCI) command from a host processor of the BT device to setup a BT activity, the BT controller configured to identify one or more scheduling requirements of the BT activity based on the HCI command, and, based on the scheduling requirements of the BT activity, to dynamically schedule the BT activity to a selected BT radio from the first and second BT radios.

24 Claims, 3 Drawing Sheets

APPARATUS, SYSTEM AND METHOD OF SCHEDULING COMMUNICATION VIA A PLURALITY OF BLUETOOTH RADIOS

TECHNICAL FIELD

Aspects described herein generally relate to scheduling communication via a plurality of Bluetooth radios.

BACKGROUND

A first Bluetooth device may be connected to and/or paired with a second Bluetooth device, for example, to transfer data between the first and second Bluetooth devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
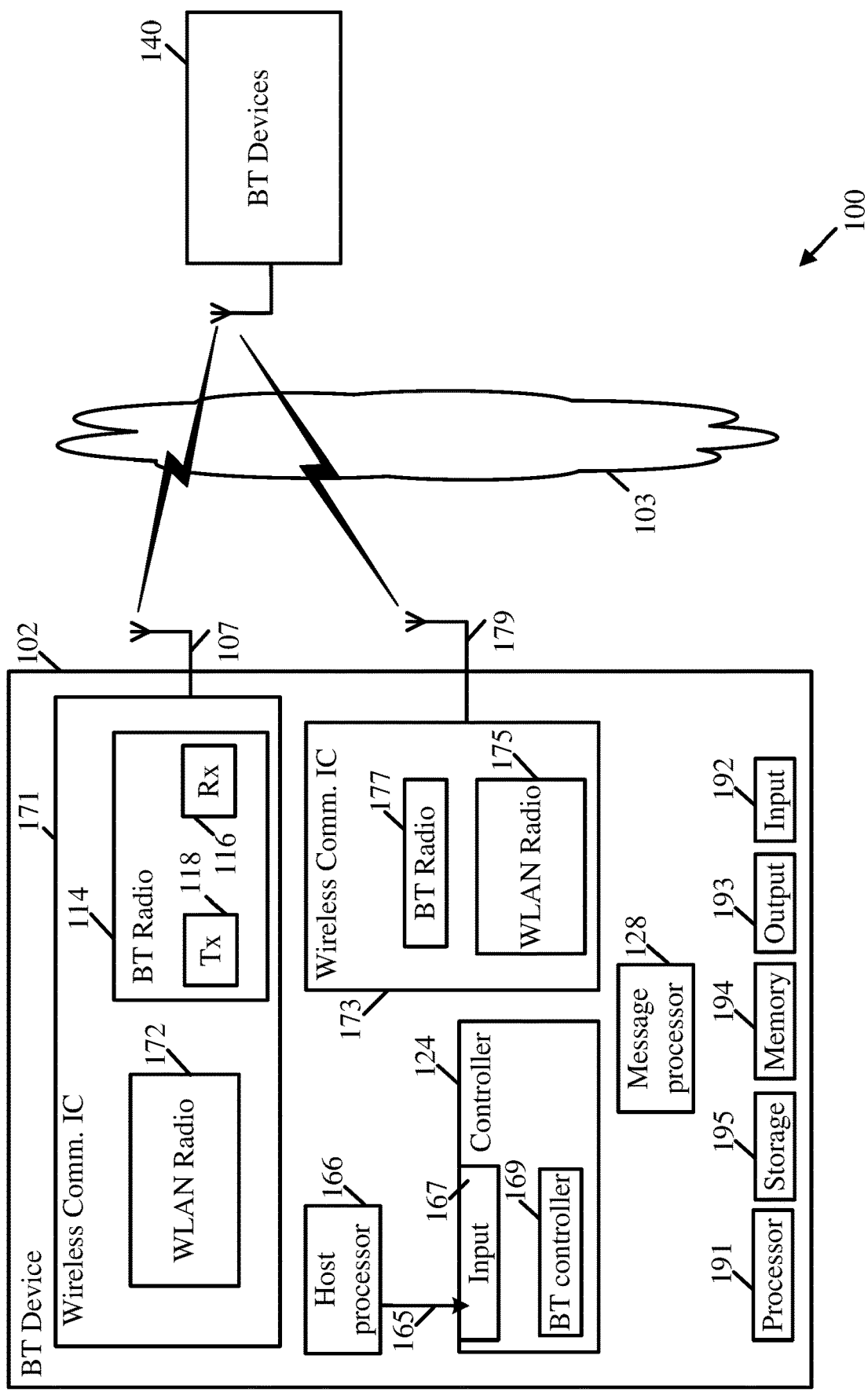
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including *Bluetooth Core Specification V* 5.0, Dec. 6, 2016, and/or future versions and/or derivatives thereof, devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016)) and/or future versions and/or derivatives thereof, devices and/or networks operating in accordance with existing WFA Peer-to-Peer (P2P) specifications (*WiFi P2P technical specification, version* 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication device 102 and/or one or more other wireless communication devices 140.

In some demonstrative aspects, wireless communication devices 102 and/or 140 may include, for example, a computing device, UE, an MD, a STA, a PC, a desktop computer, a mobile computer, a laptop computer, an Ultrabook™ computer, a Smartphone, a gaming device, a peripheral device, a notebook computer, a tablet computer, a server computer, a handheld computer, an Internet of Things (IoT) device, a sensor device, a handheld device, a wearable device, an on-board device, an off-board device, a consumer device, a vehicular device, a non-vehicular device, a mobile or portable device, a non-mobile or non-portable device, a mobile phone, a cellular telephone, a video device, an audio device, an A/V device, a video source, an audio source, a video sink, an audio sink, a Personal Media Player (PMP), a digital audio player, a gaming device, a data source, a data sink, a media player, or the like.

In some demonstrative aspects, devices 102 and/or 140 may include, operate as, and/or perform the functionality of one or more BT devices.

In some demonstrative aspects, device 102 may include a BT mobile device, and/or devices 140 may include a BT mobile device. In other aspects, device 102 and/or device 140 may include a non-mobile BT device.

In one example, devices 102 and/or 140 may include BT Low Energy (LE) (BLE) compatible devices. In other aspects, devices 102 and/or 140 may include or implement any other additional or alternative BT communication functionality, e.g., according to any other additional or alternative BT protocol.

In some demonstrative aspects, devices 102 and/or 140 may include, operate as, and/or perform the functionality of one or more STAs. For example, device 102 may include at least one STA, and/or device 140 may include at least one STA.

In some demonstrative aspects, devices 102 and/or 140 may include, operate as, and/or perform the functionality of one or more WLAN STAs.

In some demonstrative aspects, devices 102 and/or 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In other aspects, devices 102 and/or 140 may include, operate as, and/or perform the functionality of any other type of STA and/or device.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative aspects, wireless communication devices 102 and/or 140 may be capable of communicating content, data, information and/or signals via a wireless medium (WM) 103.

In some demonstrative aspects, wireless medium 103 may include, for example, a BT channel, a radio channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, devices 102 and/or 140 may include one or more BT radios including circuitry and/or logic to perform wireless communication between devices 102, 140 and/or one or more other BT devices.

In some demonstrative aspects, devices 102 and/or 140 may include one or more other radios, e.g., a WiFi radio, an OFDM radio, a cellular radio, and/or the like.

In some demonstrative aspects, device 102 may include a plurality of BT radios, e.g., as described below.

In some demonstrative aspects, device 102 may include a dual-BT radio configuration including two BT radios, e.g., as described below. In other aspects, device 102 may include any other number of BT radios, e.g., three or more BT radios.

In some demonstrative aspects, device 102 may include a first BT radio 114 and a second BT radio 177, e.g., as described below.

In some demonstrative aspects, BT radio 114 and/or BT radio 177 may include one or more wireless transmitters (Tx) including circuitry and/or logic to transmit wireless communication signals, RF signals, frames, blocks, transmission streams, packets, messages, data items, and/or data. For example, BT radio 114 and/or BT radio 177 may include at least one transmitter 118.

In some demonstrative aspects, BT radio 114 and/or BT radio 177 may include one or more wireless receivers (Rx) including circuitry and/or logic to receive wireless communication signals, RF signals, frames, blocks, transmission streams, packets, messages, data items, and/or data. For example, BT radio 114 and/or BT radio 177 may include at least one receiver 116.

In some demonstrative aspects, BT radio 114, BT radio 177, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 and/or BT radio 177 may be configured to communicate over a 2.4 GHz band, and/or any other band.

In some demonstrative aspects, BT radio 114 and/or BT radio 177 may include, or may be associated with, one or more antennas. For example, BT radio 114 may include, or may be associated with, one or more antennas 107, and/or BT radio 177 may include, or may be associated with, one or more antennas 179.

For example, antennas 107 and/or 179 may include any type of antennas suitable for transmitting and/or receiving wireless communication signals, blocks, frames, transmission streams, packets, messages and/or data. For example, antennas 107 and/or 179 may include any suitable configuration, structure and/or arrangement of one or more antenna elements, components, units, assemblies and/or arrays. In some aspects, antennas 107 and/or 179 may implement transmit and receive functionalities using separate transmit and receive antenna elements. In some aspects, antennas 107 and/or 179 may implement transmit and receive functionalities using common and/or integrated transmit/receive elements.

In some demonstrative aspects, BT radio 114 may be implemented as part of a first wireless communication Integrated Chip (IC) 171, which may include BT radio 114 and at least one other radio, e.g., a WLAN radio 172. For example, BT radio 114 and WLAN radio 172 may share the one or more antennas 107 and/or one or more other components, e.g., RF, PHY and/or MAC components, of wireless IC 171.

In some demonstrative aspects, BT radio 177 may be implemented as part of a second wireless communication IC 173, which may include BT radio 177 and at least one other radio, e.g., a WLAN radio 175. For example, BT radio 177 and WLAN radio 175 may share the one or more antennas 179 and/or one or more other components, e.g., RF, PHY and/or MAC components, of wireless IC 173.

In some demonstrative aspects, WLAN radio 172 and WLAN radio 175 may be configured to communicate over two different WLAN frequency bands.

In some demonstrative aspects, WLAN radio 172 may be configured to communicate over a 2.4 GHz WLAN band.

In some demonstrative aspects, WLAN radio 175 may be configured to communicate over a 5 GHz WLAN band.

In other aspects, WLAN radio 172 and/or WLAN radio 175 may be configured to communicate over any other additional or alternative wireless communication frequency bands.

In some demonstrative aspects, wireless communication IC 171 and/or wireless communication IC 173 may include one or more other additional or alternative radios, for example, cellular radios, and/or any other type of radio.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a BT device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124. In other aspects, the functionality of message processor 128 may be implemented as part of any other element of device 102.

In some demonstrative aspects, in some use cases, scenarios, and/or implementations, there may be a need to provide a technical solution to support improved performance and/or efficient utilization of one or more BT activities of wireless communication devices.

In some demonstrative aspects, for example, some applications, for example, gaming applications, e.g., first person shooter games, may require the use of low-latency peripherals, e.g., gaming peripherals, with very low latencies, for example, latencies of less than 5 millisecond (ms), e.g., latencies of no more than 1 ms.

In some demonstrative aspects, controller 124 may be configured to exploit the plurality of BT radios of device 102, e.g., BT radio 114 and BT radio 177, to support BT activities with improved performance and/or improved user experience, e.g., as described below.

In one example, controller 124 may be configured to exploit the plurality of BT radios of device 102, e.g., BT radio 114 and BT radio 177, to support low latency BT communications, e.g., as described below.

In another example, controller 124 may be configured to exploit the plurality of BT radios of device 102, e.g., BT radio 114 and BT radio 177, to support a plurality of simultaneous BT communication links, e.g., as described below.

In another example, controller 124 may be configured to exploit the plurality of BT radios of device 102, e.g., BT radio 114 and BT radio 177, to support improved BT scanning performance, e.g., as described below.

In another example, controller 124 may be configured to exploit the plurality of BT radios of device 102, e.g., BT radio 114 and BT radio 177, to support enhanced user experience, e.g., as described below.

In another example, controller 124 may be configured to exploit the plurality of BT radios of device 102, e.g., BT radio 114 and BT radio 177, to provide an efficient platform implementation, which may support communication with high performance, e.g., low latency, peripheral devices, for example, while obviating a need to use external, dedicated, Universal Serial Bus (USB) dongles. For example, the ability to support the communication with the high performance, e.g., low latency, peripheral devices, without using of USB dongles, may provide a technical solution, which may be cost-effective, and/or user friendly. For example, many devices may have a limited number of USB ports, and/or it may not be convenient for a user to carry around dedicated USB dongles.

In some demonstrative aspects, device 102 may include a host processor 166, which may be configured to provide to controller 124 commands for setting up one or more BT activities, e.g., as described below.

In some demonstrative aspects, controller 124 may be configured to set up, configure, and/or control one or more BT activities of device 102, for example, based on the commands from host processor 166, e.g., as described below.

In some demonstrative aspects, controller 124 may be configured to set up, configure, and/or control BT activities of BT radio 114 and/or BT radio 177, for example, based on the commands from host processor 166, e.g., as described below.

In some demonstrative aspects, host processor 166 may be configured to control and/or manage one or more operations and/or functionalities of device 102.

In some demonstrative aspects, host processor 166 may include, and/or may be configured to perform one or more operations and/or functionalities of, a central processor and/or a main processor of device 102.

In one example, host processor 166 may include, and/or may be configured to perform one or more operations and/or functionalities of, a BT host processor. In another example, host processor 166 may be configured to execute instructions of an OS of device 102. In another example, host processor 166 may be configured to control one or more power states and/or modes of operation of device 102. In other aspects, host processor 166 may be configured to perform one or more additional or alternative operations and/or functionalities.

In some demonstrative aspects, processor 191 may be configured to perform one or more operations and/or functionalities of host processor 166. In other aspects, processor 166 and processor 191 may be implemented as separate elements of device 102.

In some demonstrative aspects, host processor 166 may be configured to provide to controller 124 a Host Controller Interface (HCI) command 165 to setup a BT activity.

In some demonstrative aspects, controller 124 may include an input 167, which may be configured to receive HCI command 165 from host processor 166.

In some demonstrative aspects, HCI command 165 may be configured to indicate on or more scheduling requirements of the BT activity, e.g., as described below.

In some demonstrative aspects, HCI command 165 may be provided as an HCI message from host processor 166. For example, input 167 may include, or may be part of, an HCI component to interface between controller 124 and host processor 166.

In some demonstrative aspects, controller 124 may include, operate as, perform a role of, and/or perform one or more functionalities of, a BT controller 169, which may be configured to control BT activities of BT radio 114 and BT radio 177, e.g., as described below.

In some demonstrative aspects, BT controller 169 may include, operate as, perform a role of, and/or perform one or more functionalities of, a BT scheduler, which may be configured to schedule the BT activities to BT radio 114 and/or BT radio 177, e.g., as described below.

In some demonstrative aspects, BT controller 169 may include, or may be implemented, partially or entirely, by circuitry and/or logic, e.g., one or more processors including circuitry and/or logic, memory circuitry and/or logic, MAC circuitry and/or logic, and/or any other circuitry and/or logic, configured to perform the functionality of BT controller 169. Additionally or alternatively, one or more functionalities of BT controller 169 may be implemented by logic, which may be executed by a machine and/or one or more processors, e.g., as described below.

In one example, BT controller 169 may include circuitry and/or logic, for example, one or more processors including circuitry and/or logic, to cause, trigger and/or control BT radio 114 and/or BT radio 177 to perform one or more operations, communications and/or functionalities, e.g., as described below. In one example, BT controller 169 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, BT controller 169 may include, operate as, perform a role of, and/or perform one or more functionalities of, a shared MAC, which is shared between the BT radio 114 and the BT radio 177.

In some demonstrative aspects, BT controller 169 may be configured to control BT radio 114 and BT radio 177 to communicate with one or more other BT devices as a single BT device.

In some demonstrative aspects, BT controller 169 may be configured to present BT radio 114 and BT radio 177 as a single BT device, e.g., to host processor 166.

For example, BT controller 169 may be configured to control BT radio 114 and BT radio 177 to communicate BT communications using a single MAC address and/or a single BT Device address (BD_ADDR).

In some demonstrative aspects, BT controller 169 may be configured to control BT radio 114 and BT radio 177 to independently communicate BT communications, for example, with a multitude of other BT devices 140, e.g., including communications which would not be possible or efficient when using a single BT radio, e.g., as described below.

In some demonstrative aspects, BT controller 169 may be configured to process the HCI command 165 from host processor 166, for example, to identify one or more scheduling requirements of the BT activity to be set up, e.g., based on the HCI command 165.

In some demonstrative aspects, BT controller 169 may be configured to dynamically schedule the BT activity to a selected BT radio from the BT radios 114 and 177, for example, based on the scheduling requirements of the BT activity, e.g., as described below.

In some demonstrative aspects, the BT activity may include communication over a BT communication link with another BT device 140, e.g., as described below. For example, the one or more scheduling requirements of the BT activity may include a throughput requirement and/or a latency requirement for the BT communication link. In other aspects, the one or more scheduling requirements of the BT activity may include any other additional or alternative requirements.

In some demonstrative aspects, the BT activity may include a BT scan to detect another BT device 140, e.g., as described below. For example, the one or more scheduling requirements of the BT activity may include a scan window and/or a scan interval for the BT scan. In other aspects, the one or more scheduling requirements of the BT activity may include any other additional or alternative requirements.

In some demonstrative aspects, BT controller 169 may be configured to identify one or more first scheduling requirements of a first BT activity based on a first HCI command 165 from the host processor 166, and to schedule the first BT activity to BT radio 114, for example, according to the first scheduling requirements, e.g., as described below.

In some demonstrative aspects, BT controller 169 may be configured to identify one or more second scheduling requirements of a second BT activity based on a second HCI command 165 from the host processor 166, and to selectively schedule the second BT activity to the BT radio 114 or to the BT radio 177, for example, based on the second scheduling requirements, e.g., as described below.

In some demonstrative aspects, BT controller 169 may be configured to schedule the second BT activity to the BT radio 114, for example, based on a determination that the BT radio 114 is capable to simultaneously support the first BT activity according to the first scheduling requirements, and the second BT activity according to the second scheduling requirements, e.g., as described below.

In some demonstrative aspects, BT controller 169 may be configured to schedule the second BT activity to the BT radio 177, for example, based on a determination that the BT radio 114 is not capable to simultaneously support the first BT activity according to the first scheduling requirements, and the second BT activity according to the second scheduling requirements, e.g., as described below.

In some demonstrative aspects, BT controller 169 may be configured to schedule a plurality of BT activities to the BT radio 114, for example, based on a determination that the BT radio 114 is capable to simultaneously support the plurality of BT activities according a plurality of scheduling requirements of the plurality of BT activities, respectively, e.g., as described below.

In some demonstrative aspects, BT controller 169 may be configured to schedule as many BT activities as possible to the BT radio 114, for example, before scheduling any BT activities to the BT radio 177, e.g., as described below.

In some demonstrative aspects, BT controller 169 may be configured to process a plurality of HCI commands 165, e.g., including one or more connection setup HCI commands and one or more scan request HCI commands from the host processor 166, e.g., as described below.

In some demonstrative aspects, the connection setup HCI commands may include commands to command BT controller 169 to setup one or more BT communication links with one or more other BT devices 140, e.g., as described below.

In some demonstrative aspects, the one or more scan request HCI commands may include commands to command BT controller 169 to setup one or more BT scans, e.g., as described below.

In some demonstrative aspects, BT controller 169 may be configured to schedule the one or more BT communication links to BT radio 114, and to dynamically schedule the one or more BT scans to the BT radio 114 or the second BT radio 177, e.g., as described below.

In some demonstrative aspects, BT controller 169 may be configured to schedule the one or more BT scans to the BT radio 177, and to schedule all the BT communication links to BT radio 114, for example, as long as the BT radio 114 is capable to simultaneously support all the BT communication links. For example, such a scheduling scheme may allow to utilize the BT radio 177 to perform the BT scan with a high duty cycle, e.g., a duty cycle of 100%, as described below.

In some demonstrative aspects, BT controller 169 may be configured to dynamically schedule one or more of the BT communication links to BT radio 177, for example, based on a determination that the BT radio 114 is not capable to simultaneously support all the BT communication links, e.g., as described below.

In some demonstrative aspects, BT controller 169 may be configured to schedule to the BT radios 114 and 177 at least three BT communication links to be simultaneously maintained by the BT device 102, e.g., as described below.

In some demonstrative aspects, for example, the at least three BT communication links may include two low-latency BT communication links with two peripheral BT devices, respectively, and another BT communication link, e.g., an audio BT communication link with a BT audio device. For example, the low-latency BT communication links may be configured to support a latency requirement of no more than 5 ms, e.g., no more than 1 ms, or any other latency.

In some demonstrative aspects, BT controller 169 may be configured to schedule the two low-latency BT communication links to the BT radio 114, and to schedule the audio BT communication link to the BT radio 177, e.g., as described below.

In some demonstrative aspects, the at least three BT communication links may include at least three low-latency BT communication links with at least three peripheral BT devices, respectively. For example, the low-latency BT communication links may be configured to support a latency requirement of no more than 5 ms, e.g., no more than 1 ms, or any other latency.

In some demonstrative aspects, BT controller 169 may be configured to schedule two low-latency BT communication links of the at least three low-latency BT communication links to the BT radio 114, and to schedule at least one other low-latency BT communication link of the at least three low-latency BT communication links to the BT radio 177, e.g., as described below.

In some demonstrative aspects, BT controller 169 may be configured to schedule BT activities to the BT radios 114 and 177, for example, according to a scheduling scheme, which may exploit the BT radios 114 and 177 to support use cases and/or implementations, which may not be possible with a single BT radio, e.g., as described below.

In one example, BT controller 169 may be configured to schedule to the BT radios 114 and 177 BT communications of a low latency Bluetooth Low Energy (BLE) audio headset, a low latency gaming peripheral device, e.g., a 1 ms-latency gaming mouse, and a gaming peripheral device, e.g., a gaming keyboard. This use case may not be possible with a single BT radio. For example, devices with a single BT radio may require use of multiple USB dongles to communicate with gaming peripheral devices, e.g., a mouse, a keyboard, and/or headset. Alternatively, devices with a single BT radio may require use of wired USB peripheral devices.

For example, BT controller 169 may be configured to schedule BT communications with the audio headset to be carried out by BT radio 114, for example, over a BLE isochronous channel.

For example, BT controller 169 may be configured to schedule BT communications with the low-latency gaming peripheral device, e.g., the 1 ms-latency gaming mouse, and the gaming peripheral device, e.g., the gaming keyboard, to be carried out by BT radio 177.

For example, the ability to selectively and/or dynamically schedule the BT voice/audio to the BT radio 114, and to selectively and/or dynamically schedule the low-latency BT traffic of the peripheral devices to the BT radio 177 may provide a technical solution, which may avoid a technical problem of the low-latency BT traffic puncturing the BT voice/audio traffic, for example, if all communications are scheduled via a single BT radio.

In some demonstrative aspects, BT controller 169 may be configured to schedule BT activities to the BT radios 114 and 177, for example, according to a scheduling scheme, which may exploit the BT radios 114 and 177 to support an increased number of concurrent BT activities, e.g., as described below.

In some demonstrative aspects, BT controller 169 may be configured to schedule BT activities to the BT radios 114 and 177, for example, according to a scheduling scheme, which may exploit the BT radios 114 and 177 to support an enhanced user experience, e.g., as described below.

In some demonstrative aspects, according to a first use case, BT controller 169 may receive from host processor 166 a first HCI command 165 to set up a connection with a first Human Interface Device (HID), for example, a first gaming peripheral device, e.g., a gaming mouse.

In some demonstrative aspects, BT controller 169 may process the first HCI command 165 to identify one or more scheduling requirements of the connection with the first HID.

In some demonstrative aspects, BT controller 169 may schedule the connection with the first HID to BT radio 114.

In some demonstrative aspects, BT controller 169 may receive from host processor 166 a second HCI command 165 to set up a connection with a second HID, for example, a second gaming peripheral device, e.g., a gaming keyboard.

In some demonstrative aspects, BT controller 169 may process the second HCI command 165 to identify one or more scheduling requirements of the connection with the second HID.

In some demonstrative aspects, BT controller 169 may selectively schedule the connection with the second HID to the BT radio 114 or to the BT radio 177, for example, based on the scheduling requirements for the connection with the second HID.

In one example, BT controller 169 may schedule the connection with the second HID to BT radio 114, for example, based on a determination that the BT radio 114 is capable to simultaneously support the connection with the first HID according to the scheduling requirements for the connection with the first HID, and the connection with the second HID according to the scheduling requirements for the connection with the second HID.

In some demonstrative aspects, BT controller 169 may receive from host processor 166 a third HCI command 165 to set up another BT connection, for example, a BT voice connection with a BT audio device, e.g., a BT headset.

In some demonstrative aspects, BT controller 169 may process the third HCI command 165 to identify one or more scheduling requirements of the BT voice connection with the BT audio device.

In some demonstrative aspects, BT controller 169 may selectively schedule the BT voice connection with the BT audio device to the BT radio 114 or to the BT radio 177, for example, based on the scheduling requirements for the BT voice connection with the BT audio device.

In some demonstrative aspects, BT controller 169 may schedule the BT voice connection with the BT audio device to BT radio 177, for example, based on a determination that the BT radio 114 is not capable to simultaneously support the connection with the first HID according to the scheduling requirements for the connection with the first HID, the connection with the second HID according to the scheduling requirements for the connection with the second HID, and the BT voice connection with the BT audio device.

In some demonstrative aspects, according to a second use case, BT controller 169 may receive from host processor 166 a first HCI command 165 to set up a BT scan.

In some demonstrative aspects, BT controller 169 may process the first HCI command 165 to identify one or more scheduling requirements of the BT scan, for example, a requested scan duty cycle, e.g., a scan duty cycle of 100% or any other duty cycle.

In some demonstrative aspects, BT controller 169 may schedule the BT scan to BT radio 177.

In some demonstrative aspects, BT controller 169 may receive from host processor 166 a second HCI command 165 to set up a connection with a first peripheral device, e.g., a gaming controller, which may have been discovered, for example, during the BT scan performed by BT radio 177.

In some demonstrative aspects, BT controller 169 may process the second HCI command 165 to identify one or more scheduling requirements of the connection with the first peripheral device. For example, the scheduling requirements of the connection with the first peripheral device may include a requirement for a bi-directional data connection with low latency, e.g., a latency of 1 ms.

In some demonstrative aspects, BT controller 169 may selectively schedule the connection with the first peripheral device to the BT radio 114 or to the BT radio 177, for example, based on the scheduling requirements for the connection with the first peripheral device.

In some demonstrative aspects, BT controller 169 may select to schedule the connection with the first peripheral device to the BT radio 114, for example, to allow the BT radio 177 to continue with the BT scan according to the scan duty cycle, e.g., the duty cycle of 100%.

In some demonstrative aspects, BT controller 169 may receive from host processor 166 a third HCI command 165 to set up a connection with a second peripheral device, e.g., another gaming controller, which may have been discovered, for example, during the BT scan performed by BT radio 177.

In some demonstrative aspects, BT controller 169 may process the third HCI command 165 to identify one or more scheduling requirements of the connection with the second peripheral device. For example, the scheduling requirements of the connection with the second peripheral device may include a requirement for a bi-directional data connection with low latency, e.g., a latency of 1 ms.

In some demonstrative aspects, BT controller 169 may selectively schedule the connection with the second peripheral device to the BT radio 114 or to the BT radio 177, for example, based on the scheduling requirements for the connection with the second peripheral device.

In some demonstrative aspects, BT controller 169 may select to schedule the connection with the second peripheral device to the BT radio 114, for example, based on a determination that BT radio 114 is capable to support the connections with the first and second peripheral devices. For example, scheduling the connections of the first and second peripheral devices to the BT radio 114 may allow the BT radio 177 to continue with the BT scan according to the scan duty cycle, e.g., the duty cycle of 100%.

In some demonstrative aspects, BT controller 169 may receive from host processor 166 a fourth HCI command 165 to set up a connection with a third peripheral device, e.g., another gaming controller, which may have been discovered, for example, during the BT scan performed by BT radio 177.

In some demonstrative aspects, BT controller 169 may process the fourth HCI command 165 to identify one or more scheduling requirements of the connection with the third peripheral device. For example, the scheduling requirements of the connection with the third peripheral device may include a requirement for a bi-directional data connection with low latency, e.g., a latency of 1 ms.

In some demonstrative aspects, BT controller 169 may selectively schedule the connection with the third peripheral device to the BT radio 114 or to the BT radio 177, for example, based on the scheduling requirements for the connection with the third peripheral device.

In some demonstrative aspects, BT controller 169 may select to schedule the connection with the third peripheral device to the BT radio 177, for example, based on a determination that BT radio 114 is not capable to simultaneously support the connections with the first, second and third peripheral devices.

In some demonstrative aspects, BT controller 169 may reconfigure the BT radio 177 to perform the BT scan according to a lower scan duty cycle, e.g., a duty cycle of 50% or any other duty cycle, which may allow BT radio 177 to support the connection with the third peripheral device.

In some demonstrative aspects, BT controller 169 may receive from host processor 166 a fifth HCI command 165 to set up a connection with a fourth peripheral device, e.g., another gaming controller, which may have been discovered, for example, during the BT scan performed by BT radio 177.

In some demonstrative aspects, BT controller 169 may process the fifth HCI command 165 to identify one or more scheduling requirements of the connection with the fourth peripheral device. For example, the scheduling requirements of the connection with the fourth peripheral device may include a requirement for a bi-directional data connection with low latency, e.g., a latency of 1 ms.

In some demonstrative aspects, BT controller 169 may selectively schedule the connection with the fourth peripheral device to the BT radio 114 or to the BT radio 177, for example, based on the scheduling requirements for the connection with the fourth peripheral device.

In some demonstrative aspects, BT controller 169 may select to schedule the connection with the fourth peripheral device to the BT radio 177, for example, based on a determination that BT radio 177 is capable to support the connections with the third and fourth peripheral devices.

In some demonstrative aspects, BT controller 169 may reconfigure the BT radio 177 to stop the BT scan, for example, in order to allow BT radio 177 to support the connections with the third and fourth peripheral devices.

In some demonstrative aspects, BT controller 169 may be configured to schedule BT activities to the BT radios 114 and 177, for example, according to a scheduling scheme, which may exploit the BT radios 114 and 177 to support an increased scan duty cycle, e.g., as described below.

In some demonstrative aspects, according to a third use case, BT controller 169 may schedule two BT connections, e.g., two BT LE HID connections, to BT radio 114. For example, the two BT connections may be configured according to a connection interval of 7.5 ms.

In some demonstrative aspects, BT controller 169 may receive from host processor 166 a first HCI command 165 to set up a BT scan with a relatively low duty cycle, e.g., a scan duty cycle of 10% or any other duty cycle.

In some demonstrative aspects, BT controller 169 may selectively schedule the BT scan to the BT radio 114 or to the BT radio 177, for example, based on the scheduling requirements for the BT scan.

For example, BT controller 169 may select to schedule the BT scan to the BT radio 114, for example, based on a determination that the BT radio 114 is capable to simultaneously support the BT scan together with the two BT connections. For example, scheduling the BT scan and the two BT connections to the BT radio 114 may provide a technical advantage to maintain a reduced power consumption, e.g., relative to a power consumption for operating both BT radios 114 and 117.

In some demonstrative aspects, BT controller 169 may receive from host processor 166 a second HCI command 165 to set up a BT connection Asynchronous Connection-Less (ACL) connection or any other BT connection, with a BT audio device, which may have been discovered, for example, during the BT scan performed by BT radio 114.

In some demonstrative aspects, BT controller 169 may process the second HCI command 165 to identify one or more scheduling requirements of the connection with the BT audio device. For example, the scheduling requirements of the connection with the BT device may include a requirement for a high throughput connection with support of retransmissions.

In some demonstrative aspects, BT controller 169 may selectively schedule the BT ACL connection to the BT radio 114 or to the BT radio 177, for example, based on the scheduling requirements for the BT ACL connection.

For example, BT controller 169 may select to schedule the ACL connection to the BT radio 114, for example, based on a determination that the BT radio 114 is capable to simultaneously support the BT ACL connection together with the BT scan and the two BT connections. For example, scheduling the BT ACL connection, the BT scan, and the two BT connections to the BT radio 114 may provide a technical advantage to maintain a reduced power consumption, e.g., relative to a power consumption for operating both BT radios 114 and 117.

In some demonstrative aspects, BT controller 169 may receive from host processor 166 a third HCI command 165 to reconfigure BT scan with a relatively high duty cycle, e.g., a scan duty cycle of at least 50% or any other duty cycle.

In some demonstrative aspects, BT controller 169 may selectively schedule the BT scan to the BT radio 114 or to the BT radio 177, for example, based on the reconfigured scheduling requirements for the BT scan.

For example, BT controller 169 may select to schedule the BT scan to the BT radio 177, for example, based on a determination that the BT radio 114 is not capable to simultaneously support the BT scan according to the higher duty cycle together with the two BT connections and the BT ACL connection.

In some demonstrative aspects, BT controller 169 may be configured to dynamically schedule the BT scan between the BT radio 114 and the BT radio 177, for example, based on the requirements of the BT scan, e.g., based on the duty cycle of the BT scan, and/or based on one or more other BT activities scheduled to the BT radios 114 and/or 177, e.g., as described above.

In some demonstrative aspects, the ability to dynamically schedule the BT scan between the BT radio 114 and the BT radio 177 may provide a technical advantage of enhanced user experience, for example, by supporting detection of other BT devices with shorter scanning periods, and/or by supporting applications which may require use of very high scan duty cycles.

In one example, a BT device utilizing a single BT radio may only be able to support a very low scan duty cycle, e.g., a duty cycle of 10% or 20%, for example, when the single BT radio is to engage one or more other BT connections. This low scan duty cycle may result in detection of advertisements with relatively long median time of 8.6 s, and with relatively low detection chances, e.g., a detection chance of 58% within 10 seconds (s), a detection chance of 94% within 20 s, and/or a detection chance of 99.9% within 30 s. This would mean that up to 5% of the users may have to wait as long as 30 seconds for a successful detection.

In another example, a BT device utilizing two BT radios, e.g., device 102 utilizing BT radios 114 and 177, may be capable to operate one of the Bt radios as a dedicated scan receiver, e.g., as described above. For example, BT controller 169 may configure BT radio to perform the BT scan at a duty cycle of 100%, e.g., as described above. Accordingly, the scan duty cycle of 100% may support a relatively short median detection time of about 1.01 s, with relatively high detection chances, e.g., a detection chance of 99.99%. This would mean that user may have to wait up to about 1 s for a successful detection.

Figure 2:
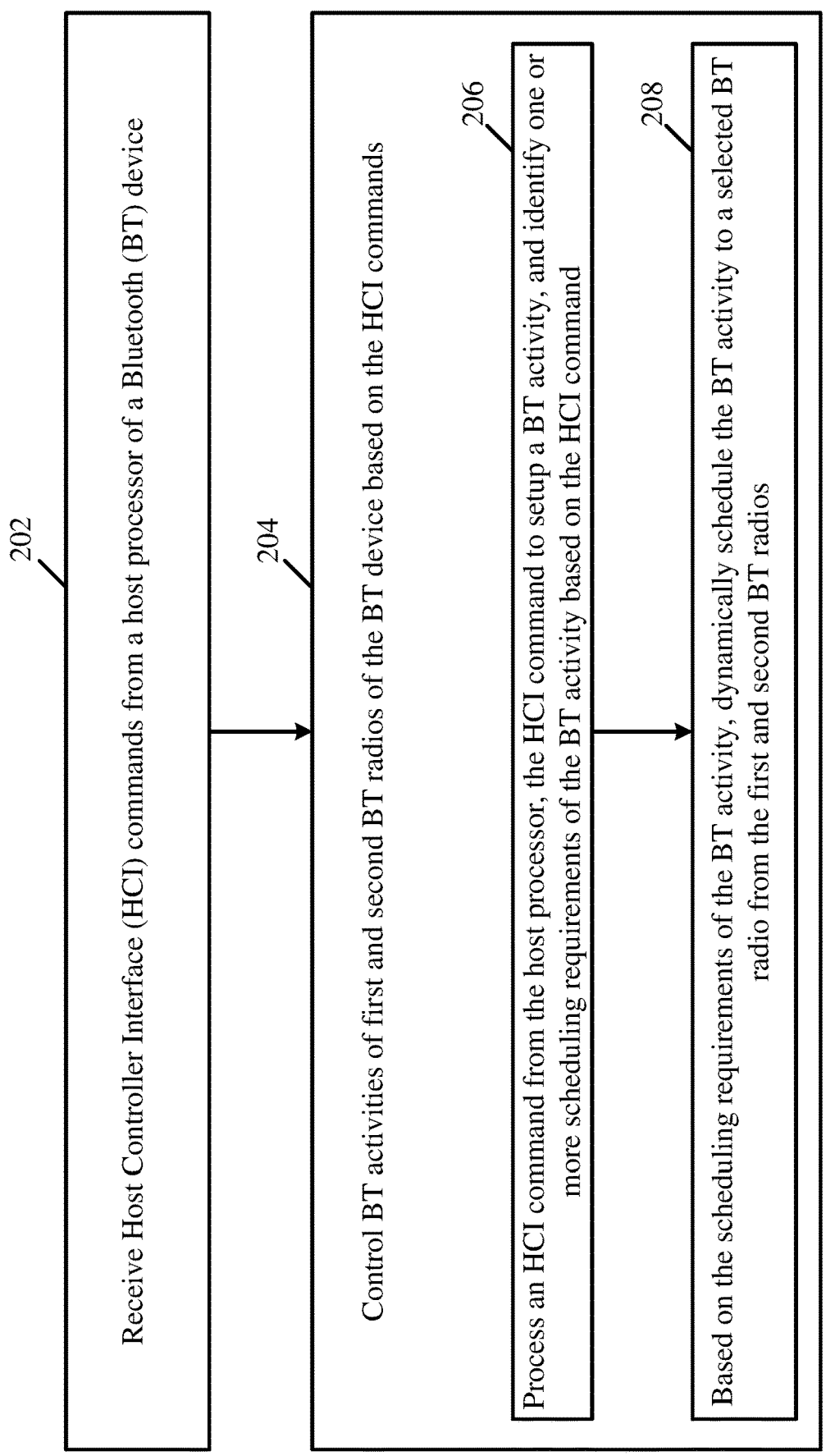
FIG. 2 is a schematic flow-chart illustration of a method of scheduling communication via a plurality of Bluetooth radios, in accordance with some demonstrative aspects.

Reference is made to FIG. 2, which schematically illustrates a method of scheduling communication via a plurality of Bluetooth radios, in accordance with some demonstrative aspects. For example, one or more of the operations of the method of FIG. 2 may be performed by one or more elements of a system, e.g., system 100 (FIG. 1), a BT device, e.g., BT device 102 (FIG. 1), and/or a controller, e.g., controller 124 (FIG. 1) and/or BT controller 169 (FIG. 1).

As indicated at block 202, the method may include receiving, at a BT controller of BT device, HCI commands from a host processor of the BT device. For example, BT controller 169 (FIG. 1) may receive HCI commands 165 (FIG. 1) from host processor 166 (FIG. 1), e.g., as described above.

As indicated at block 204, the method may include controlling BT activities of first and second BT radios of the BT device based on the HCI commands. For example, BT controller 169 (FIG. 1) may be configured to control BT activities of BT radios 114 and 177 (FIG. 1) based on the HCI commands 165 (FIG. 1), e.g., as described above.

As indicated at block 206, controlling the BT activities of the first and second BT radios may include processing an HCI command from the host processor, the HCI command to setup a BT activity, and identifying one or more scheduling requirements of the BT activity based on the HCI command. For example, BT controller 169 (FIG. 1) may be configured to identify one or more scheduling requirements of the BT activity, for example, based on HCI command 165 (FIG. 1), e.g., as described above.

As indicated at block 208, controlling the BT activities of the first and second BT radios may include dynamically scheduling the BT activity to a selected BT radio from the first and second BT radios, for example, based on the scheduling requirements of the BT activity. For example, BT controller 169 (FIG. 1) may be configured to dynamically schedule the BT activity to a selected BT radio from the BT radios 114 and 177 (FIG. 1), for example, based on the scheduling requirements of the BT activity, e.g., as described above.

Figure 3:
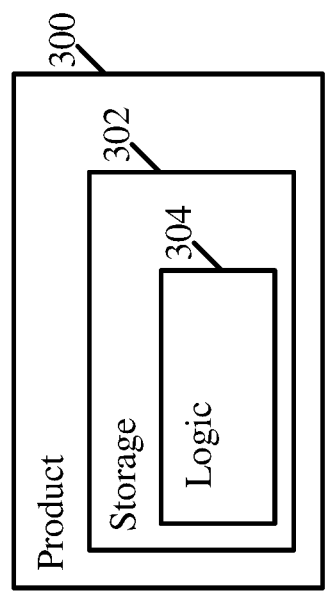
FIG. 3 is a schematic illustration of a product of manufacture, in accordance with some demonstrative aspects.

Reference is made to FIG. 3, which schematically illustrates a product of manufacture 300, in accordance with some demonstrative aspects. Product 300 may include one or more tangible computer-readable ("machine-readable") non-transitory storage media 302, which may include computer-executable instructions, e.g., implemented by logic 304, operable to, when executed by at least one computer processor, enable the at least one computer processor to implement one or more operations at device 102 (FIG. 1), BT radio 114 (FIG. 1), BT radio 177 (FIG. 1), controller 124 (FIG. 1), BT controller 169 (FIG. 1), receiver 116 (FIG. 1), transmitter 118 (FIG. 1), and/or message processor 128 (FIG. 1), to cause device 102 (FIG. 1), BT radio 114 (FIG. 1), BT radio 177 (FIG. 1), controller 124 (FIG. 1), BT controller 169 (FIG. 1), receiver 116 (FIG. 1), transmitter 118 (FIG. 1), and/or message processor 128 (FIG. 1) to perform, trigger and/or implement one or more operations and/or functionalities, and/or to perform, trigger and/or implement one or more operations and/or functionalities described with reference to the FIGS. 1 and/or 2, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 300 and/or machine-readable storage media 302 may include one or more types of computer-readable storage media capable of storing data, including volatile memory, non-volatile memory, removable or non-removable memory, erasable or non-erasable memory, writeable or rewriteable memory, and the like. For example, machine-readable storage media 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes apparatus of a Bluetooth (BT) device, the apparatus comprising a first BT radio; a second BT radio; and a BT controller including logic and circuitry configured to control BT activities of the first and second BT radios, the BT controller configured to process a Host Controller Interface (HCI) command from a host processor of the BT device to setup a BT activity, the BT controller configured to identify one or more scheduling requirements of the BT activity based on the HCI command, and, based on the scheduling requirements of the BT activity, to dynamically schedule the BT activity to a selected BT radio from the first and second BT radios.

Example 2 includes the subject matter of Example 1, and optionally, wherein the BT controller is configured to identify one or more first scheduling requirements of a first BT activity based on a first HCI command from the host processor, to schedule the first BT activity to the first BT radio according to the first scheduling requirements, to identify one or more second scheduling requirements of a second BT activity based on a second HCI command from the host processor, and to selectively schedule the second BT activity to the first BT radio or to the second BT radio based on the second scheduling requirements.

Example 3 includes the subject matter of Example 2, and optionally, wherein the BT controller is configured to schedule the second BT activity to the first BT radio based on a determination that the first BT radio is capable to simultaneously support the first BT activity according to the first scheduling requirements and the second BT activity according to the second scheduling requirements.

Example 4 includes the subject matter of Example 2, and optionally, wherein the BT controller is configured to schedule the second BT activity to the second BT radio based on a determination that the first BT radio is not capable to simultaneously support the first BT activity according to the first scheduling requirements and the second BT activity according to the second scheduling requirements.

Example 5 includes the subject matter of any one of Examples 1-4, and optionally, wherein the BT controller is configured to schedule a plurality of BT activities to the first BT radio based on a determination that the first BT radio is capable to simultaneously support the plurality of BT activities according a plurality of scheduling requirements of the plurality of BT activities, respectively.

Example 6 includes the subject matter of any one of Examples 1-5, and optionally, wherein the BT controller is configured to process one or more connection setup HCI commands and one or more scan request HCI commands from the host processor, the connection setup HCI commands to setup one or more BT communication links with one or more other BT devices, the one or more scan request HCI commands to setup one or more BT scans, wherein the BT controller is configured to schedule the one or more BT communication links to the first BT radio, and to dynamically schedule the one or more BT scans to the first BT radio or the second BT radio.

Example 7 includes the subject matter of any one of Examples 1-6, and optionally, wherein the BT controller is configured to schedule as many BT activities as possible to the first BT radio before scheduling any BT activities to the second BT radio.

Example 8 includes the subject matter of any one of Examples 1-7, and optionally, wherein the BT controller is configured to schedule to the first and second BT radios at least three BT communication links to be simultaneously maintained by the BT device.

Example 9 includes the subject matter of Example 8, and optionally, wherein the at least three BT communication links comprise two low-latency BT communication links with two peripheral BT devices, respectively, and an audio BT communication link with a BT audio device, the low-latency BT communication links supporting a latency requirement of no more than 1 millisecond (ms).

Example 10 includes the subject matter of Example 9, and optionally, wherein the BT controller is configured to schedule the two low-latency BT communication links to the first BT radio, and the audio BT communication link to the second BT radio.

Example 11 includes the subject matter of any one of Examples 8-10, and optionally, wherein the at least three BT communication links comprise at least three low-latency BT communication links with at least three peripheral BT devices, respectively, the low-latency BT communication links supporting a latency requirement of no more than 1 millisecond (ms).

Example 12 includes the subject matter of Example 11, and optionally, wherein the BT controller is configured to schedule two low-latency BT communication links of the at least three low-latency BT communication links to the first BT radio, and at least one other low-latency BT communication link of the at least three low-latency BT communication links to the second BT radio.

Example 13 includes the subject matter of any one of Examples 1-12, and optionally, wherein the BT activity comprises communication over a BT communication link with another BT device, the one or more scheduling requirements of the BT activity comprise at least one of a throughput requirement or a latency requirement for the BT communication link.

Example 14 includes the subject matter of any one of Examples 1-12, and optionally, wherein the BT activity comprises a BT scan to detect another BT device, the one or more scheduling requirements of the BT activity comprise a scan window and a scan interval.

Example 15 includes the subject matter of any one of Examples 1-14, and optionally, wherein the BT controller comprises a shared Media Access Controller (MAC), which is shared between the first BT radio and the second BT radio.

Example 16 includes the subject matter of any one of Examples 1-15, and optionally, comprising a first wireless communication integrated chip comprising the first BT radio and a first Wireless Local Area Network (WLAN) radio, and a second wireless communication integrated chip comprising the second BT radio and a second WLAN radio.

Example 17 includes the subject matter of Example 16, and optionally, wherein the first WLAN radio is configured to communicate over a 2.4 Gigahertz (GHz) WLAN frequency band, and the second WLAN radio is configured to communicate over a 5 GHz WLAN frequency band Example 18 includes the subject matter of Example 1-17, and optionally, comprising one or more first antennas connected to the radio BT radio, one or more second antennas connected to the second BT radio, the host processor, and a memory to store information processed by the host processor.

Example 19 comprises an apparatus comprising means for executing any of the described operations of Examples 1-18.

Example 20 comprises a product comprising one or more tangible computer-readable non-transitory storage media comprising computer-executable instructions operable to, when executed by at least one processor, enable the at least one processor to cause a computing device to perform any of the described operations of Examples 1-18.

Example 21 comprises an apparatus comprising: a memory interface; and processing circuitry configured to: perform any of the described operations of Examples 1-18.

Example 22 comprises a method comprising any of the described operations of Examples 1-18.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a Bluetooth (BT) device, the apparatus comprising:
a first BT radio;
a second BT radio; and
a BT controller including logic and circuitry configured to control BT activities of the first and second BT radios, the BT controller configured to process a Host Controller Interface (HCI) command from a host processor of the BT device to setup a BT activity, the BT controller configured to identify one or more scheduling requirements of the BT activity based on the HCI command, and, based on the scheduling requirements of the BT activity, to schedule the BT activity to a selected BT radio from the first and second BT radios, wherein the BT controller is configured to identify one or more first scheduling requirements of a first BT activity based on a first HCI command from the host processor, to schedule the first BT activity to the first BT radio according to the first scheduling requirements, to identify one or more second scheduling requirements of a second BT activity based on a second HCI command from the host processor, and to selectively schedule the second BT activity to the first BT radio or to the second BT radio based on the second scheduling requirements.

2. The apparatus of claim 1, wherein the BT controller is configured to schedule the second BT activity to the first BT radio based on a determination that the first BT radio is capable to simultaneously support the first BT activity according to the first scheduling requirements and the second BT activity according to the second scheduling requirements.

3. The apparatus of claim 1, wherein the BT controller is configured to schedule the second BT activity to the second BT radio based on a determination that the first BT radio is not capable to simultaneously support the first BT activity according to the first scheduling requirements and the second BT activity according to the second scheduling requirements.

4. The apparatus of claim 1, wherein the BT controller is configured to schedule a plurality of BT activities to the first BT radio based on a determination that the first BT radio is capable to simultaneously support the plurality of BT activities according a plurality of scheduling requirements of the plurality of BT activities, respectively.

5. The apparatus of claim 1, wherein the BT controller is configured to process one or more connection setup HCI commands and one or more scan request HCI commands from the host processor, the one or more connection setup HCI commands to setup one or more BT communication links with one or more other BT devices, the one or more scan request HCI commands to setup one or more BT scans, wherein the BT controller is configured to schedule the one or more BT communication links to the first BT radio, and to selectively schedule a BT scan of the one or more BT scans to the first BT radio or to the second BT radio.

6. The apparatus of claim 1, wherein the BT controller is configured to schedule as many BT activities as possible to the first BT radio before scheduling any BT activities to the second BT radio.

7. The apparatus of claim 1, wherein the BT controller is configured to schedule to the first and second BT radios at least three BT communication links to be simultaneously maintained by the BT device.

8. The apparatus of claim 7, wherein the at least three BT communication links comprise two low-latency BT communication links with two peripheral BT devices, respectively, and an audio BT communication link with a BT audio device, the low-latency BT communication links supporting a latency requirement of no more than 1 millisecond (ms).

9. The apparatus of claim 8, wherein the BT controller is configured to schedule the two low-latency BT communication links to the first BT radio, and the audio BT communication link to the second BT radio.

10. The apparatus of claim 7, wherein the at least three BT communication links comprise at least three low-latency BT communication links with at least three peripheral BT devices, respectively, the low-latency BT communication links supporting a latency requirement of no more than 1 millisecond (ms).

11. The apparatus of claim 10, wherein the BT controller is configured to schedule two low-latency BT communication links of the at least three low-latency BT communication links to the first BT radio, and at least one other low-latency BT communication link of the at least three low-latency BT communication links to the second BT radio.

12. The apparatus of claim 1, wherein the BT activity comprises communication over a BT communication link with another BT device, the one or more scheduling requirements of the BT activity comprise at least one of a throughput requirement or a latency requirement for the BT communication link.

13. The apparatus of claim 1, wherein the BT activity comprises a BT scan to detect another BT device, the one or more scheduling requirements of the BT activity comprise a scan window and a scan interval.

14. The apparatus of claim 1, wherein the BT controller comprises a shared Media Access Controller (MAC), which is shared between the first BT radio and the second BT radio.

15. The apparatus of claim 1 comprising a first wireless communication integrated chip comprising the first BT radio and a first Wireless Local Area Network (WLAN) radio, and a second wireless communication integrated chip comprising the second BT radio and a second WLAN radio.

16. The apparatus of claim 15, wherein the first WLAN radio is configured to communicate over a 2.4 Gigahertz (GHz) WLAN frequency band, and the second WLAN radio is configured to communicate over a 5 GHz WLAN frequency band.

17. The apparatus of claim 1 comprising one or more first antennas connected to the first BT radio, one or more second antennas connected to the second BT radio, the host processor, and a memory to store information processed by the host processor.

18. A product comprising one or more tangible computer-readable non-transitory storage media comprising computer-executable instructions operable to, when executed by at least one processor, enable the at least one processor to cause a Bluetooth (BT) controller of a BT device to:
  process a Host Controller Interface (HCI) command from a host processor of the BT device to setup a BT activity;
  identify one or more scheduling requirements of the BT activity based on the HCI command; and
  based on the scheduling requirements of the BT activity, schedule the BT activity to a selected BT radio from a first BT radio of the BT device and a second BT radio of the BT device, wherein the instructions, when executed, cause the BT controller to identify one or more first scheduling requirements of a first BT activity based on a first HCI command from the host processor, to schedule the first BT activity to the first BT radio according to the first scheduling requirements, to identify one or more second scheduling requirements of a second BT activity based on a second HCI command from the host processor, and to selectively schedule the second BT activity to the first BT radio or to the second BT radio based on the second scheduling requirements.

19. The product of claim 18, wherein the instructions, when executed, cause the BT controller to schedule a plurality of BT activities to the first BT radio based on a determination that the first BT radio is capable to simultaneously support the plurality of BT activities according a plurality of scheduling requirements of the plurality of BT activities, respectively.

20. The product of claim 18, wherein the instructions, when executed, cause the BT controller to schedule the second BT activity to the first BT radio based on a determination that the first BT radio is capable to simultaneously support the first BT activity according to the first scheduling requirements and the second BT activity according to the second scheduling requirements.

21. The product of claim 18, wherein the instructions, when executed, cause the BT controller to schedule the second BT activity to the second BT radio based on a determination that the first BT radio is not capable to simultaneously support the first BT activity according to the first scheduling requirements and the second BT activity according to the second scheduling requirements.

22. The product of claim 18, wherein the instructions, when executed, cause the BT controller to process one or more connection setup HCI commands and one or more scan request HCI commands from the host processor, the one or more connection setup HCI commands to setup one or more BT communication links with one or more other BT devices, the one or more scan request HCI commands to setup one or more BT scans; and to schedule the one or more BT communication links to the first BT radio, and to selectively schedule a BT scan of the one or more BT scans to the first BT radio or to the second BT radio.

23. The product of claim 18, wherein the instructions, when executed, cause the BT controller to schedule as many BT activities as possible to the first BT radio before scheduling any BT activities to the second BT radio.

24. The product of claim 18, wherein the instructions, when executed, cause the BT controller to schedule to the first and second BT radios at least three BT communication links to be simultaneously maintained by the BT device.

* * * * *